United States Patent [19]

Borthwick

[11] Patent Number: 5,743,546
[45] Date of Patent: Apr. 28, 1998

[54] BICYCLE CRANK ARM SHORTENER

[76] Inventor: Paul G. Borthwick, 214 Rainbow Dr., Marshalltown, Iowa 50158

[21] Appl. No.: 614,049

[22] Filed: Mar. 12, 1996

[51] Int. Cl.$^6$ ................................................ B62M 3/02
[52] U.S. Cl. ........................ 280/259; 74/594.7; 74/594.4
[58] Field of Search ..................... 280/259; 74/594.7, 74/594.4, 594.6, 594.1

[56]     References Cited

U.S. PATENT DOCUMENTS

| 2,749,771 | 6/1956 | Pearl | 74/594.4 |
| 5,161,430 | 11/1992 | Febey | 74/594.7 |
| 5,566,589 | 10/1996 | Buck | 74/594.7 |

OTHER PUBLICATIONS

One Page Showing Copy of Phil Wood Crank Arm Shortener and Tandems East Crankarm Shortener.

*Primary Examiner*—Brian L. Johnson
*Assistant Examiner*—Avraham Lerner
*Attorney, Agent, or Firm*—Zarley, McKee, Thomte, Voorhees, & Sease

[57]     ABSTRACT

The crank arm of a bicycle is selectively shortened by removing the pedal and attaching one end of the shortener to the pedal opening in the crank arm, with the other end of the shortener being locked to the crank arm by a pair of cams positioned against opposite side edges of the crank arm. Rotation of bolts through the eccentrically mounted cams causes the cams to snugly engage the crank arm side edges to lock the shortener to the crank arm.

7 Claims, 1 Drawing Sheet

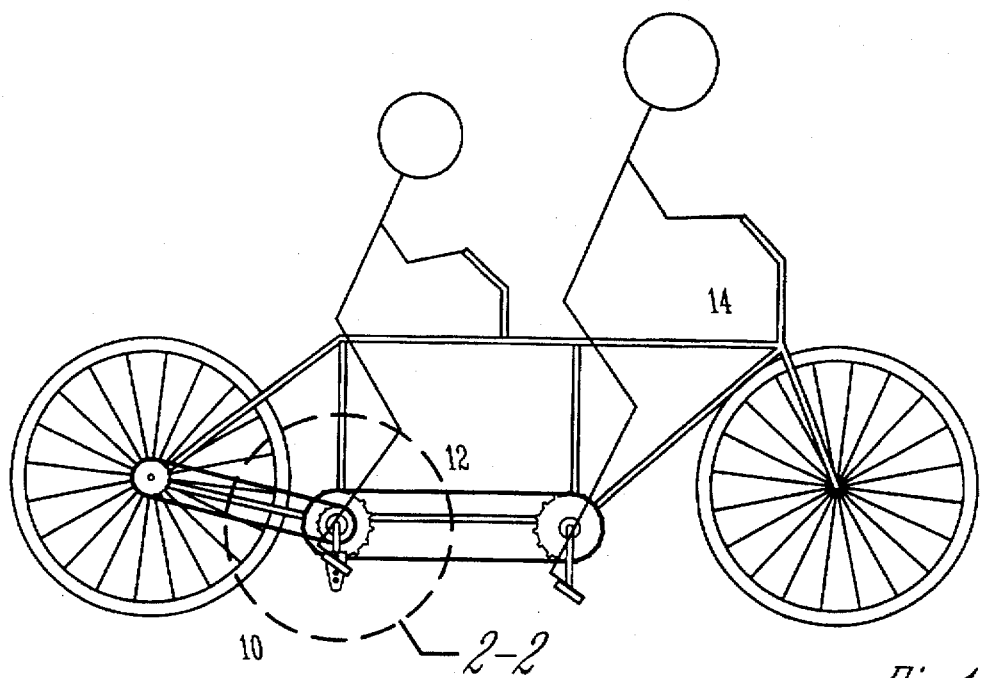
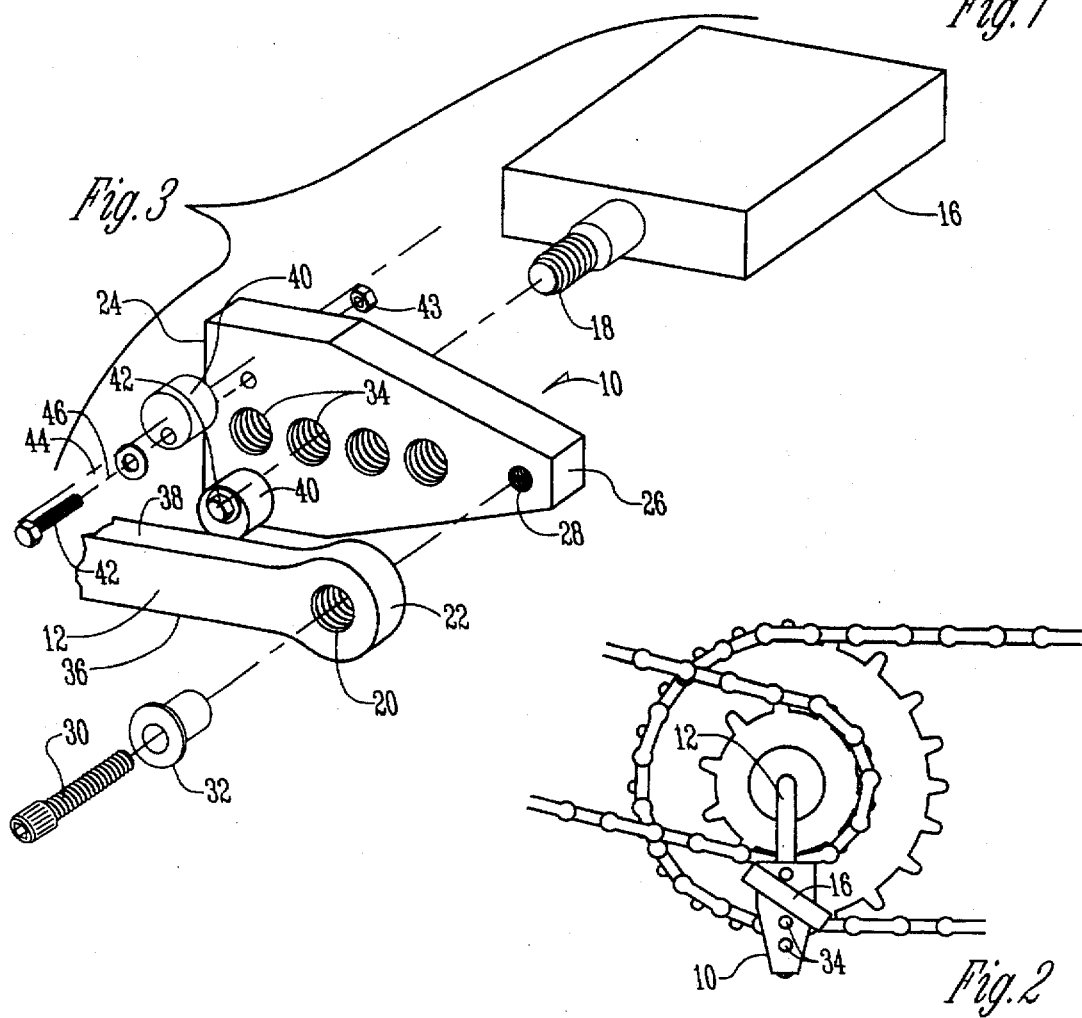

BICYCLE CRANK ARM SHORTENER

BACKGROUND OF THE INVENTION

The tandem bicycle provides a unique opportunity for two people to have a great adventure. Tandems are most commonly ridden by adults or persons who have legs long enough to reach the pedals. There are exceptions, however, where the tandem bicycle is modified to allow for children to ride and pedal from the back seat of a tandem.

One modified approach involves adding a second set of pedals, very short crank arms and a bottom bracket, all mounted on the child's seat tube. This approach brings the pedals much closer to the seat. Very young children can ride and pedal when this modification has been made.

Another approach is available to accommodate children who are just a few inches too short to ride the tandem without modification. The pedals are removed from the crank arms of the child (rear) position. A fixture commonly called a crank arm shortener is attached to the crank arm. The pedals are screwed into the crank arm shorteners, which position the pedals closer to the pivot axle/bearing, thus making it possible for short people to reach the pedals. The invention defined here is of that design.

Whereas all crank arm shorteners have the common goal of moving the pedal closer to the pivot axle/bearing, the methods of securing the crank arm shortener to the crank arm differ. One design uses a clamp arrangement that fits around the crank arm and can be adjusted along the length of the arm. This application is limited in that it will not fit on all crank arm cross-sections that are now available.

Another popular option uses a thick metal base, one end of which is secured to the crank arm by means of a fastener that uses the one threaded hole in the crank arm where the pedal was removed to allow assembly of the crank arm shortener. The attached crank arm shortener base contains several threaded holes that are positioned so that each threaded hole is aligned along the crank arm axis, allowing the rider to select a pedal position closer to the pivot axle/bearing.

In addition to securing one end of the crank arm shortener to the tandem crank arm, a second means of securing the opposite inner end of the crank arm must be employed. A common way employed to achieve this "second means" is to design the crank arm shortener base with a pair of base extensions, with each extension containing a threaded screw that can be adjusted against the tandem crank arm. This method will mar the exterior surface of the crank arm.

What is needed is a way to fasten the inner end of the crank arm shortener to the crank arm which is fast, easy, inexpensive and will not mar the crank arm.

SUMMARY OF THE INVENTION

This invention addresses the "second means" of securing the crank arm shortener to the tandem crank arm. This invention employs two eccentrically operated cams that can be rotationally adjusted against the side edges of the tandem crank arm. The advantage is that the crank arm shortener can be secured to the tandem crank arm without the use of the direct contact of a threaded screw which can cause damage to the tandem crank arm.

Advantages of this invention include: lower costs to the consumer; significantly less machining as compared to the approach where metal must be routed out to form the extensions; the cams are more friendly to the crank arm than where a threaded screw is forced against the crank arm; and there is more positive engagement than with the cradle model without the threaded screws.

DESCRIPTION OF THE DRAWINGS

FIG. 1 is a side elevation view of a tandem bicycle employing the crank arm shortener of this invention.

FIG. 2 is a fragmentary enlarged in scale view of the bicycle indicated by the line 2—2 in FIG. 1, showing the crank arm shortener mounted on the rear crank arm.

FIG. 3 is a fragmentary exploded perspective view of the crank arm and crank arm shortener with a pedal.

DESCRIPTION OF THE PREFERRED EMBODIMENT

The crank arm shortener of this invention is referred to generally in FIG. 2 by the reference numeral 10, and is shown mounted on the rear crank arm 12 of a tandem bicycle 14.

The crank arm 12 includes a conventional pedal 16 having a threaded bolt 18 normally received in a threaded opening 20 on the outer end 22 of the crank arm. When the crank arm shortener 10 is used, the pedal 16 is removed and the shortener is secured to the crank arm 12, utilizing the threaded opening 20 in the outer end 22 of the crank arm 12.

The crank arm shortener is elongated and includes an inner end 24 and an outer end 26. The outer end 26 has a threaded opening 28 which receives a bolt 30 extending through a bushing 32 received in the crank arm opening 20. The crank arm shortener 10 includes a series of threaded screw openings 34 for selectively receiving the threaded pedal bolt 18.

The crank arm 12 includes opposite side edges 36 and 38 which are engaged by a pair of eccentrically mounted cams 40 on the shortener 10. A bolt 42 extends through the cam 40 and the shortener 10 and is engaged by a nut 43 on the opposite side of the shortener. The cams 40 each have a center axis 44 but the cams rotate about an axis through the bolts 42. A rotation axis 46 of rotation for the bolt 42 is offset from the center axis 44, thus allowing for a substantial variation in the distance between the cams 40 depending on the position to which the cams are rotated. Crank arms 12 of different widths can thus be readily accommodated between the cams 40. It is apparent that the opposite side edges 36 and 38 of the crank arm 12 will not be marred by the smooth, rounded surfaces of the cams 40. The cams 40, however, provide a very positive locking means for the shortener 10. The cams are manually turned clockwise against the crank arm, and then turning of the bolt 42 in a clockwise direction causes the cam through friction to be snugged tight with the crank arm 12. The nut 43 is provided on the shortener 10 on the opposite side from the cam 40 to receive the bolt 42. Thus when the bolt 42 is rotated as far as it can be clockwise against the crank arm 12, the nut can then be tightened, assuring that the shortener 10 will not become loosened through use.

It is thus seen that the crank arm shortener of this invention allows for quick and easy modification of the standard crank arm to accommodate a child. The mounting of the shortener to the crank arm is positive and will leave no marks on the crank arm.

What is claimed is:

1. A bicycle with a crank arm shortener, said bicycle comprising, a crank arm having opposite side edges and an opening at an outer end, said crank arm shortener having bolt means securing said shortener to said crank arm by said bolt means being received in said opening, said shortener being positioned to extend along said crank arm, said shortener having a pair of spaced apart cams remote to said opening and on opposite sides of said crank arm engaging said crank arm side edges to limit movement of said shortener relative to said crank arm and said cams including bolt means rotatably connecting said cams to said shortener to vary the distance therebetween to receive crank arms therebetween having varying widths.

2. The bicycle of claim 1 wherein said crank arm shortener includes at least one pedal connection opening along the shortener length longitudinally inwardly of said bolt means in which a pedal bolt means is received.

3. The bicycle of claim 1 wherein said crank arm shortener includes an opening which receives said crank arm bolt means.

4. The bicycle of claim 2 wherein said crank arm shortener includes at least one opening in said shortener and said pedal bolt means are threaded for threaded inter engagement.

5. The bicycle of claim 2 and said at least one opening is one of a plurality of openings spaced apart longitudinally inwardly of the crank arm bolt means to allow for selective positioning of a pedal along the length of said crank arm.

6. A bicycle crank arm shortener, said shortener having inner and outer ends, opposite sides, and opposite side edges, said shortener including crank arm fastening means at said outer end for connecting said shortener to a pedal fastening means on a crank arm, and said shortener including a plurality of pedal fastening means along the shortener longitudinal length for selectively positioning a pedal longitudinally inwardly of said crank arm fastening means, and a pair of adjustable spaced apart cam means on one side of said shortener at the inner end to receive crank arms having varying widths there between with said cam means engaging a crank arm along its opposite side edges.

7. The bicycle crank arm shortener of claim 6 wherein said cam means have a center axis and a cam bolt means connects said cam means to said shortener on a cam axis of rotation offset from said center axis to vary the distance between said cams when said cams are rotated about said cam axis of rotation.

* * * * *